Sept. 24, 1963 W. Y. ELLIOTT, JR 3,105,228

MAGNETIC DRUM SYSTEM

Filed April 25, 1960 9 Sheets-Sheet 1

INVENTOR
W. Y. ELLIOTT
BY J. T. Comfort
ATTORNEY

FLIP FLOP

PHASE DISCRIMINATOR

T.P.G. PHASE DETECTOR

AMPLIFIER

United States Patent Office 3,105,228

Patented Sept. 24, 1963

3,105,228

MAGNETIC DRUM SYSTEM

William Y. Elliott, Jr., Woodstock, N.Y., assignor to International Business Machines Corporation, New York, N.Y., a corporation of New York Filed Apr. 25, 1960, Ser. No. 24,559
5 Claims. (Cl. 340—174.1)

This invention relates to magnetic drum storage, and more particularly to apparatus for providing timing pulses for magnetic drums.

Magnetic drums are used extensively with digital computers for main memory storage and auxiliary memory storage. In such a use the drum is ordinarily rotated at high speed and data is read from and written on the drum in storage registers. A series of timing pulses is provided for each storage register to control reading from and writing on the drum, and to control other operations of the drum system.

Heretofore, timing pulses have been provided by reading a timing track consisting of a succession of regularly spaced magnetized marks and as the drum rotates a sinusoidal waveform is read from the drum and supplied to a timing circuit to condition the timing circuit to allow the production of timing pulses at the positive slope zero crossing as well as the negative slope zero crossing of the sine wave. Thus, two timing pulses are produced for each register. Further timing pulses may be derived from the basic two timing pulses by adding time delay circuits to delay the basic pulses and produce additional pulses.

Timing pulses must be evenly spaced to properly control the operation of the drum system and set time delays made it necessary that the speed of rotation of the drum be constant for otherwise timing pulses would be generated at a varying rate and could not properly control the operation of the drum system. By maintaining close mechanical tolerances, it has been possible to maintain the speed of rotation fairly constant and as usually only two additional pulses were generated besides the two generated at the slope crossings the timing pulses were produced at a fairly regular rate.

Digital computers have become more complex and more operations are performed with the information as it is read from a magnetic drum storage element. The additional operations require additional timing pulses per drum register and the storage registers are often packed closer together to provide more storage per drum making timing more critical and it has become impractical to utilize time delays to provide additional timing pulses. For example, if twice as many storage registers are packed on a drum and eight timing pulses are used per storage register, sixteen timing pulses will be used in the same physical space where four were used. Changes in speed of the rotation of the drum which would not affect the generation of the timing pulses heretofore would now cause variations if time delays were used to provide the timing pulses and irregularities would be introduced into the timing pulses.

It is desirable to construct a magnetic drum memory system which is capable of being utilized with different types of computer systems yet often different digital computer systems operate with different timing cycles and it is necessary to change the timing of a drum system before it may be used with a different computer system. If time delays are used to produce extra timing pulses a drum system must be entirely redesigned and new time delays introduced before the change may be made.

An index position must be provided on the magnetic drum to indicate the starting position of the memory tracks by setting the angular position counter to zero. Heretofore a second timing track has been used with a "one" recorded in the second timing track at the index position. The provision of a second timing track is costly and only one storage register is used on the track.

It is therefore an object of this invention to provide groups of regularly spaced timing pulses for each storage register on a drum.

It is another object of this invention to provide a drum timing circuit which provides regularly spaced groups of timing pulses for each storage register regardless of the speed of rotation of the drum.

Yet another object of this invention is to generate an index position signal.

It has been discovered that the disadvantages of the prior art may be solved by a new and unusual solution. In accordance with the principles of this invention an oscillator is provided for generating a plurality of successive pulses. A Phase Discriminator synchronizes a triangular waveform read from the timing track on a magnetic drum with the oscillator to insure that the pulses are generated in synchronism with the rotation of the drum. A pulse distributor divides the pulses into groups of timing pulses which may be used to control the operation of the drum system. If the drum speeds up, the oscillator speeds up, and if the drum slows down, the oscillator slows down also and timing pulses are provided at a regular rate regardless of the speed of the drum.

This invention also provides a drum indexing circuit for generating an index signal in a new way. A single timing track is placed on the magnetic drum with a series of magnetized spots. The timing track at the index position is not etched so as to provide a discontinuity. The periodic waveform derived from the timing track and a signal derived from the oscillator are supplied to a circuit which produces an index signal in response to that portion of the periodic waveform derived from the discontinuity. The index signal is normally applied to the angular position counter to reset the angular position counter.

The foregoing and other objects, features and advantages of the invention will be apparent from the following more particular description of a preferred embodiment of the invention, as illustrated in the accompanying drawings.

In the FIGS.:

Figure 1:
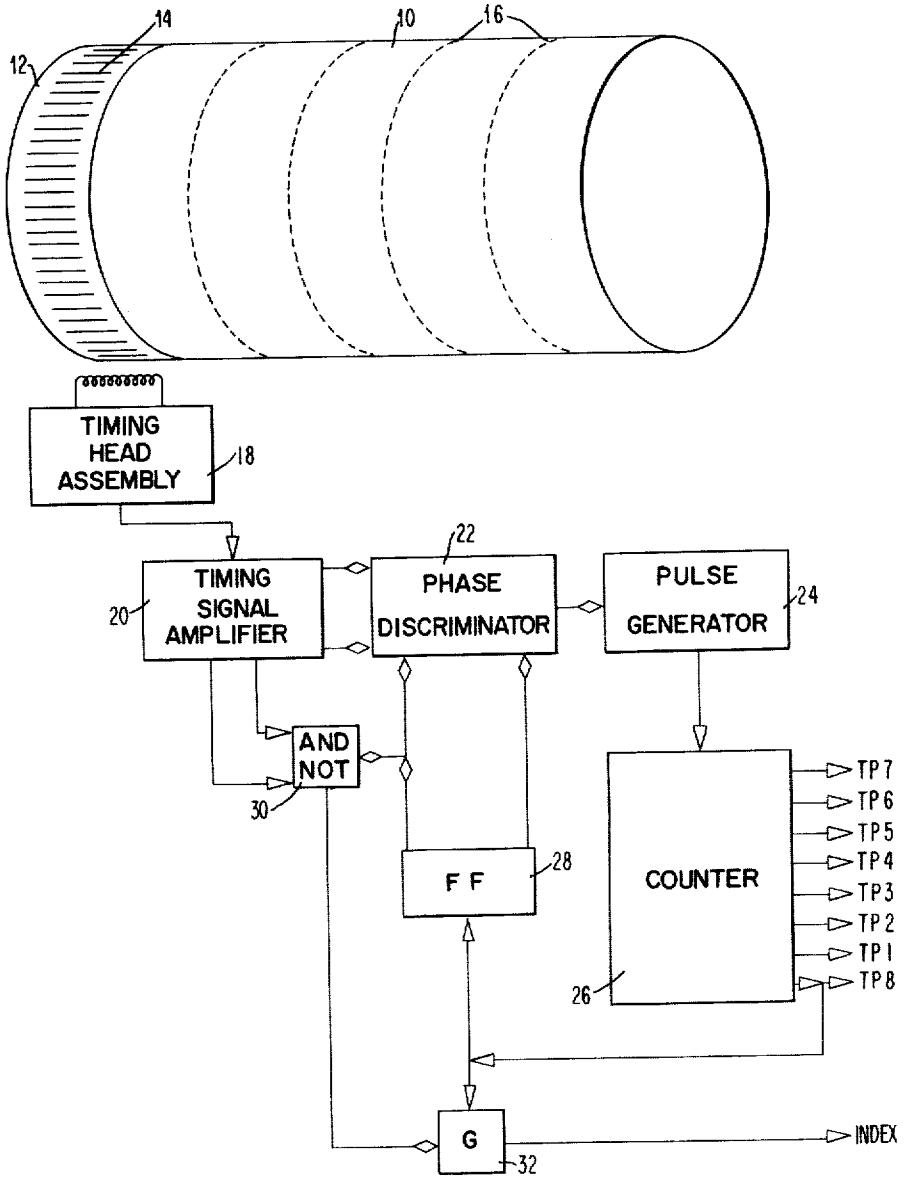
FIG. 1 is a block diagram showing a preferred embodiment of the invention.
Figure 7A:
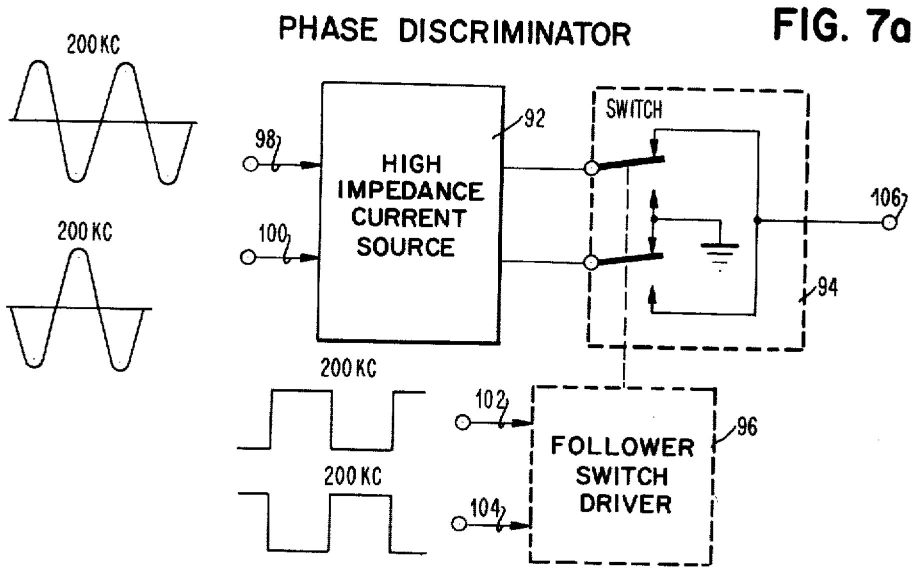

FIG. 7*a* is a simplified block diagram of a suitable Phase Discriminator for use in the embodiment illustrated in FIG. 1.

Figure 7B:
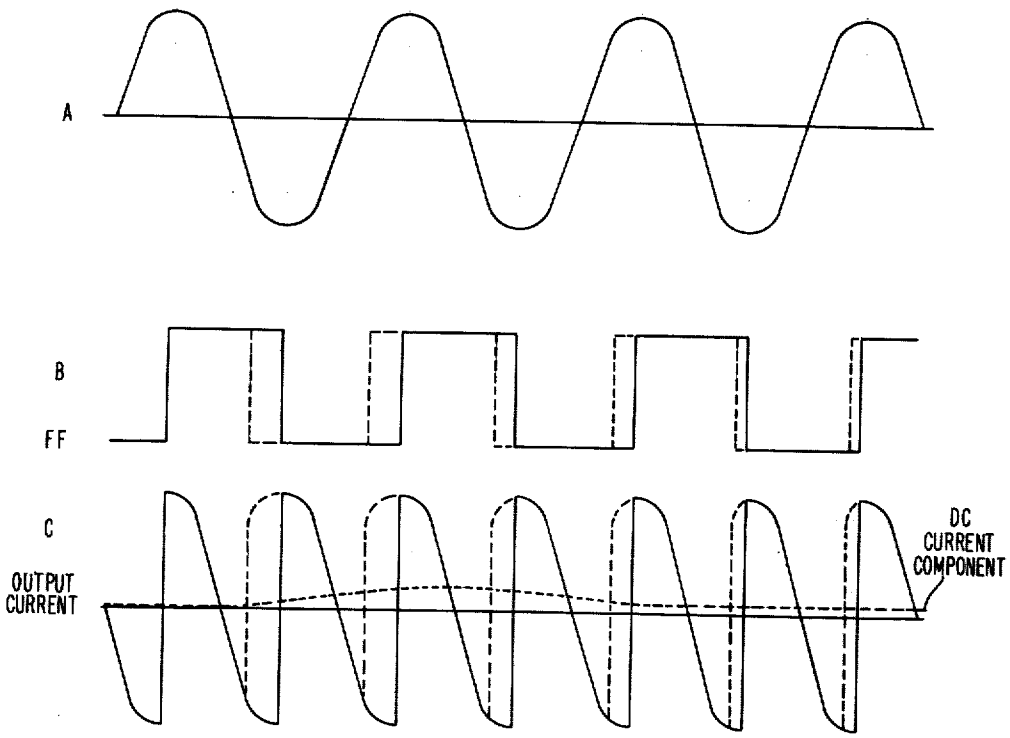

FIG. 7*b* is a timing chart showing the relationship between the two input waveforms to the phase discriminator and the output of the phase discriminator.

Figure 7C:
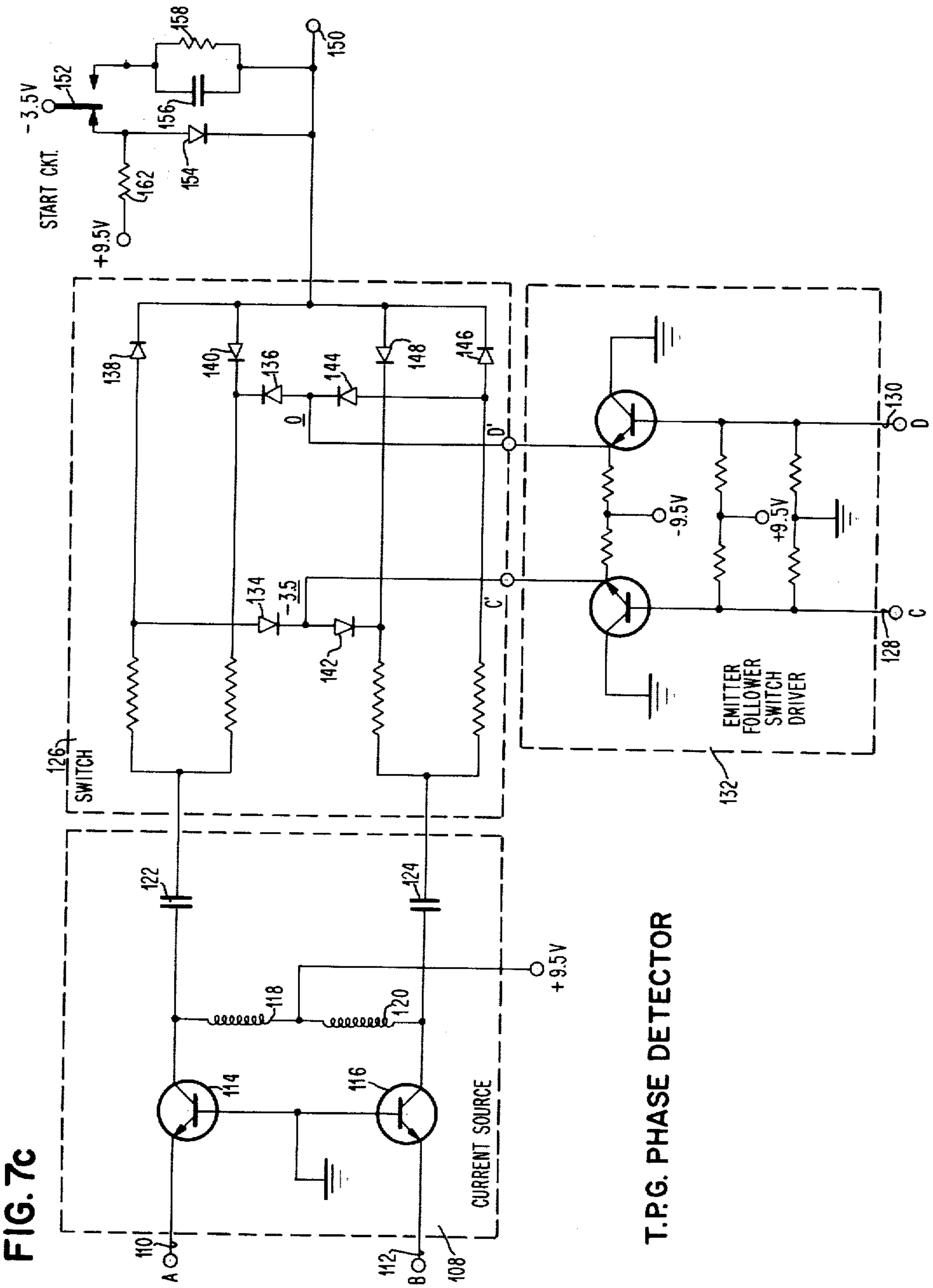

FIG. 7*c* is a circuit diagram of the phase discriminator shown as a simplified block diagram in FIG. 7*a*.

Figure 8:
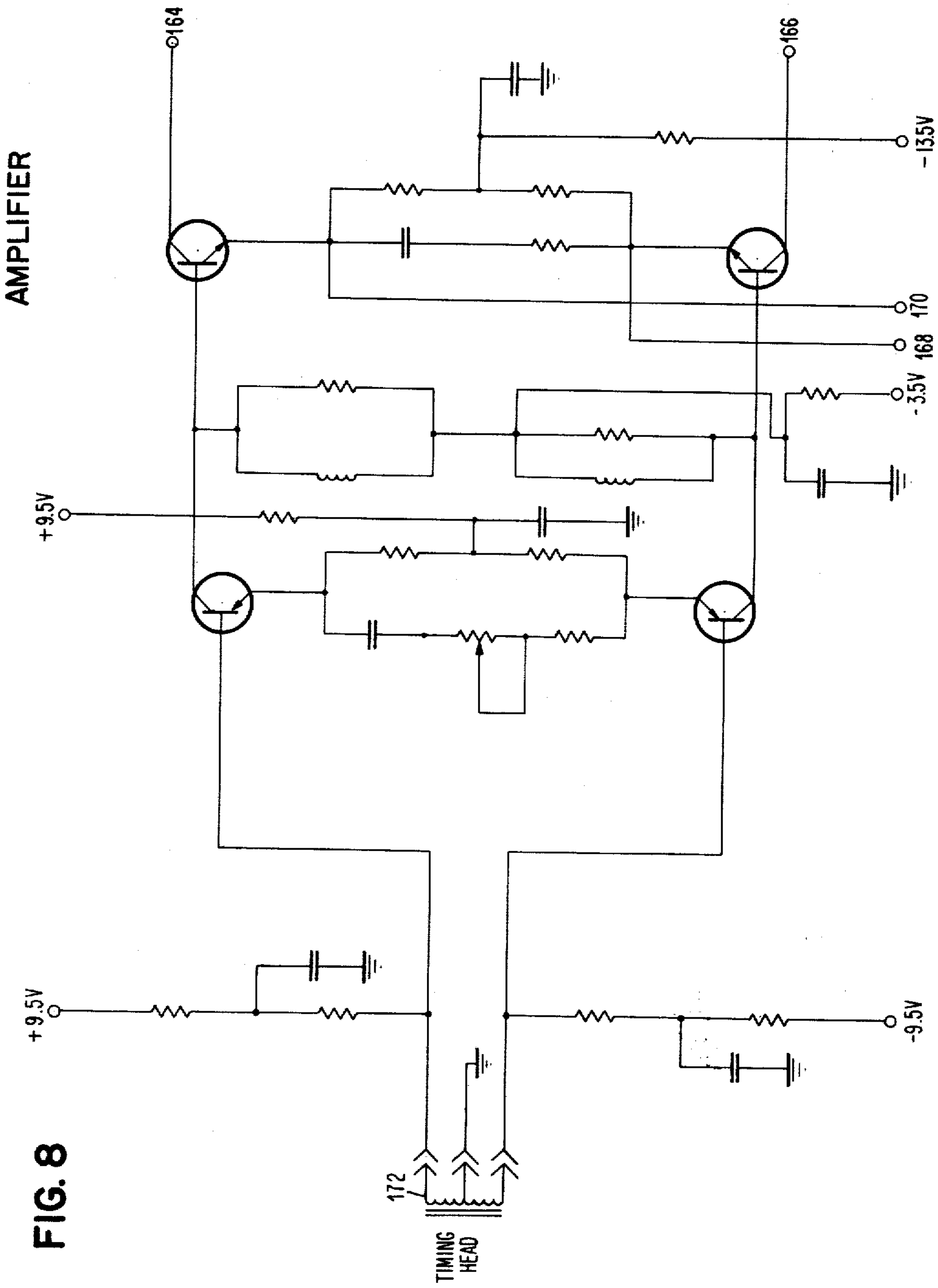

FIG. 8 is a circuit diagram of a suitable amplifier and timing head for use in the embodiment illustrated in FIG. 1.

Figure 9:
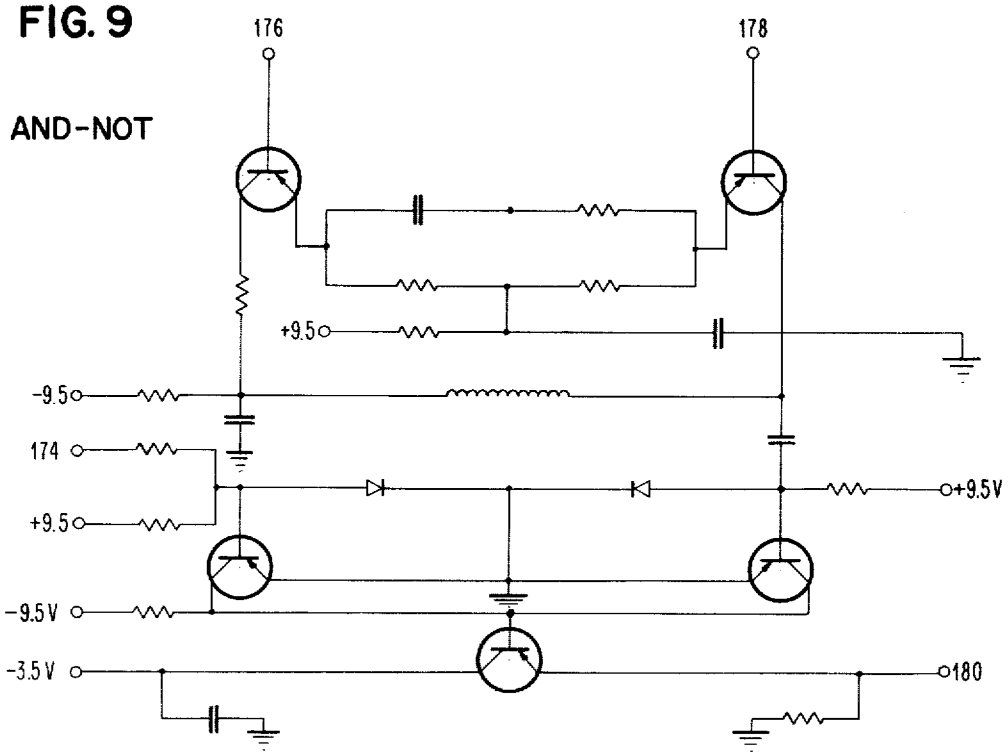

FIG. 9 is a suitable AND-NOT circuit for use in the embodiment illustrated in FIG. 1.

*General Description*

Figure 2:
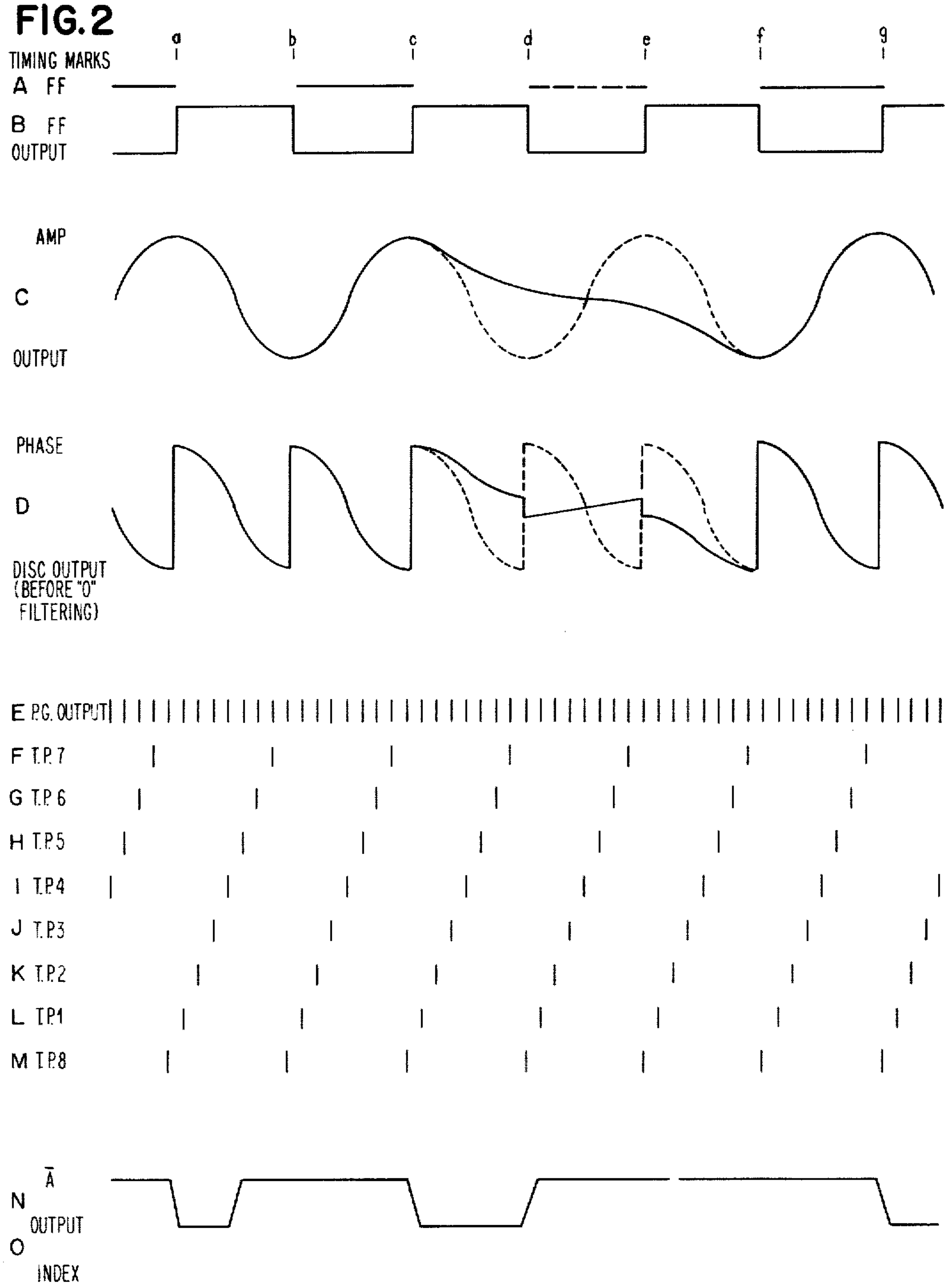
FIG. 2 is a timing chart showing the timing relationship between the timing pulses and other signals.

Reference should now be made to the drawings and more particularly to FIGS. 1 and 2 for a description of the invention. In FIG. 1 a Timing Disk 12 having a Timing Track 14 is secured to a Magnetic Storage Drum 10. The magnetic drum is provided with a plurality of Memory Tracks 16 each containing 8,196 memory registers. The rim of Timing Disk 12 is plated with a magnetic material and etched at equal intervals to provide 4,097 regularly spaced magnetic marks but is not etched at one place to provide the indexing operation which will be described later. Timing pulses must be provided to identify the locations of memory storage registers and to control logical operations involving data read from the drum. In FIG. 2 waveform (C) is derived from the timing marks (A) on Timing Track 14 in FIG. 1 by Timing Head Assembly 18 and supplied through Amplifier 20 to Phase Discriminator 22 (in FIG. 1).

Pulse Generator 24 is free running and produces standard pulses at a frequency controlled by a D.C. signal (2.91 mc., nominal) from Phase Discriminator 22. D.C. controlled Pulse Generator 24 supplies a pulse train (E in FIG. 2) to Counter 26 which acts as an eight to one frequency divider. The divided successive timing pulses are labeled TP1–TP8 (F–N in FIG. 2) and have a repetition rate nominally 364 kc. Successive timing pulses are normally spaced 325 milli-microseconds apart.

Each TP–8 pulse (N in FIG. 2) is applied to Flip-flop 28, complementing Flip-flop 28 and causing the flip-flop to produce a square wave output signal (B in FIG. 2). The square wave signal (B in FIG. 2) is applied to Phase Discriminator 22 and compared with a triangular waveform (C in FIG. 2) derived from Reading Timing Channel 14. In the specific embodiment illustrated and described the square wave and the triangular waveform are selected to be normally identical in a frequency and ninety degrees out of phase. Phase Discriminator 22 detects phase deviations from normal and produces a D.C. output current proportional to the deviation from the normal phase relationship to change the frequency of Pulse Generator 24 until the proper relationship is again established. The operation of the Phase Discriminator will be described in more detail with relation to FIGS. 7*a* through 7*c*.

TP–8 (N in FIG. 2) when properly synchronized with the rotation of the drum indicates the successive memory storage registers in the memory channels. The other timing pulses are used for logical operations essential to the operation of the drum system and the computer with which the drum system is used.

*Generation of the Index Signal*

Referring still to FIGS. 1 and 2 for a description of the generation of the Index Signal the triangular waveform (C in FIG. 2) is applied through Amplifier 20 to AND-NOT circuit 30. A one hundred eighty-two kc. square wave output signal from Flip-flop 28 is also applied to AND-NOT circuit 30. The timing track is not etched at the index position (*d* to *e* in FIG. 2) causing a discontinuity and the resulting waveform is almost zero in amplitude between *d* and *e* as Timing Head Assembly 18 sees almost no rate of change of magnetic flux during this interval. An output level produced by AND-NOT circuit 30 (N in FIG. 2) conditions Gate 32 which is sampled by a TP–8 pulse. Normally the output level from AND-NOT circuit 30 does not condition Gate 32 at the time TP–8 pulses sample Gate 32. However, when the timing head reads the discontinuity in the timing track the resulting waveform builds up at the normal rate and collapses at a slower rate, allowing the waveform to be positive for a longer period of time, and causing the AND-NOT circuit to produce output D.C. level for a longer period of time and conditioning Gate 32 to pass a TP–8 pulse. The TP–8 pulse is thus passed by Gate 32 to produce an index pulse once per drum revolution at the index deposition.

*Pulse Generator*

Figure 3:
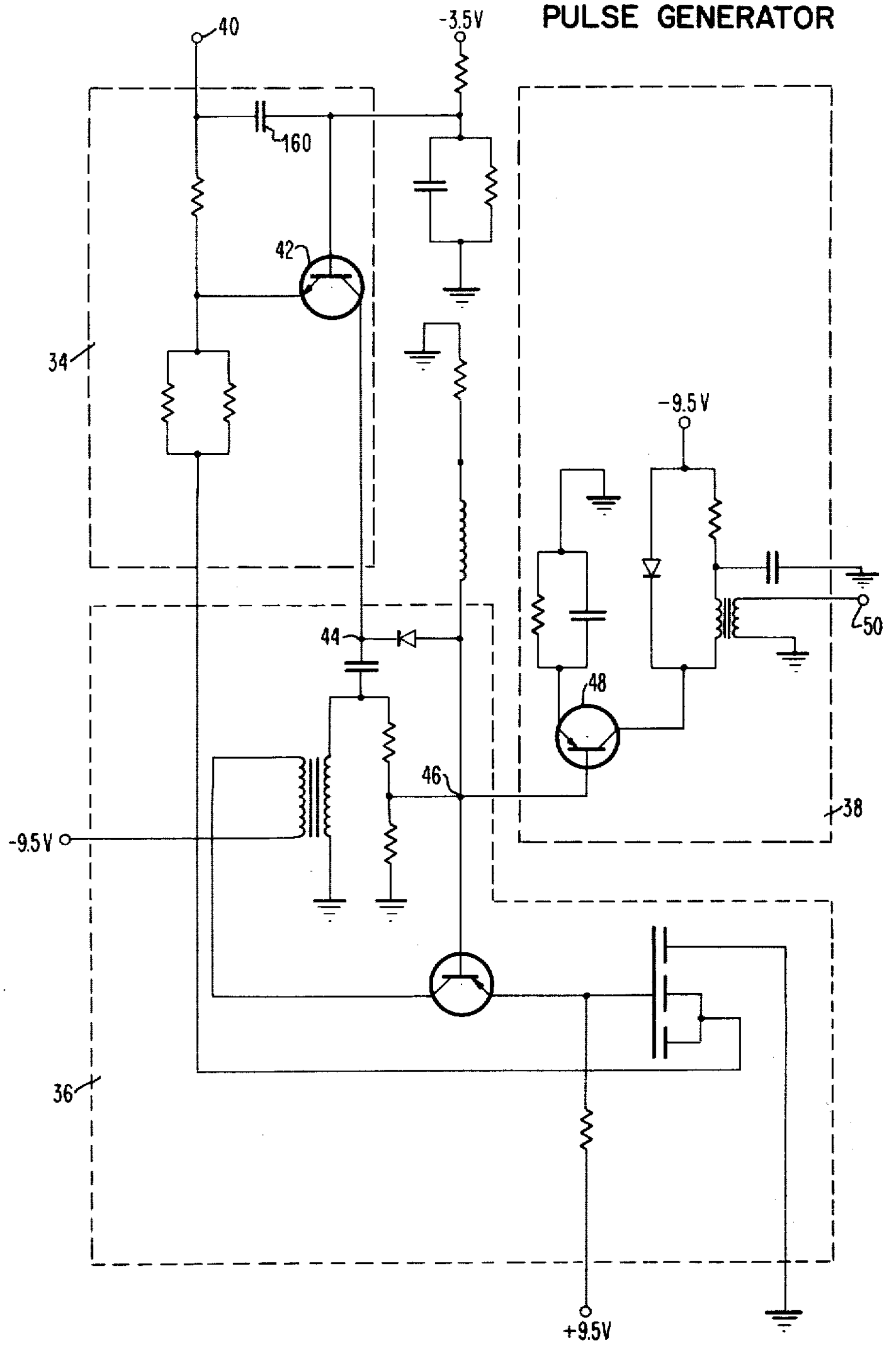
FIG. 3 is a circuit diagram of a suitable pulse generator for use in the embodiment illustrated in FIG. 1.

Referring now to FIG. 3 a suitable Pulse Generator shown as block 24 in FIG. 1 is described. For descriptive purposes the pulse generator is divided into three sections shown enclosed by dotted lines. Variable Current Source 34 supplies current for Oscillator 36. Amplifier and Pulse Shaper 38 acts as a buffer between Oscillator 36 and the load. A triangular waveform with a D.C. current component (waveform D in FIG. 2 and C in FIG. 7*b*) received on Conductor 40 from the Phase Discriminator controls the rate of generation of pulses by the pulse generator. Capacitor 160 filters the A.C. components of the periodic waveform to ground allowing the D.C. component only to flow to the emitter of Transistor 42 and thus control the frequency of the oscillator.

The collector output from Transistor 42 at point 44 controls the frequency of free running Oscillator 36. Free running Oscillator 36 produces a train of negative pulses at point 46 which are applied to the base of Transistor 48. Buffer Amplifier 38 produces a train of pulses amplified and shaped which are delivered on Conductor 50 to Counter 26 in FIG. 1.

*Counter*

Figure 4:
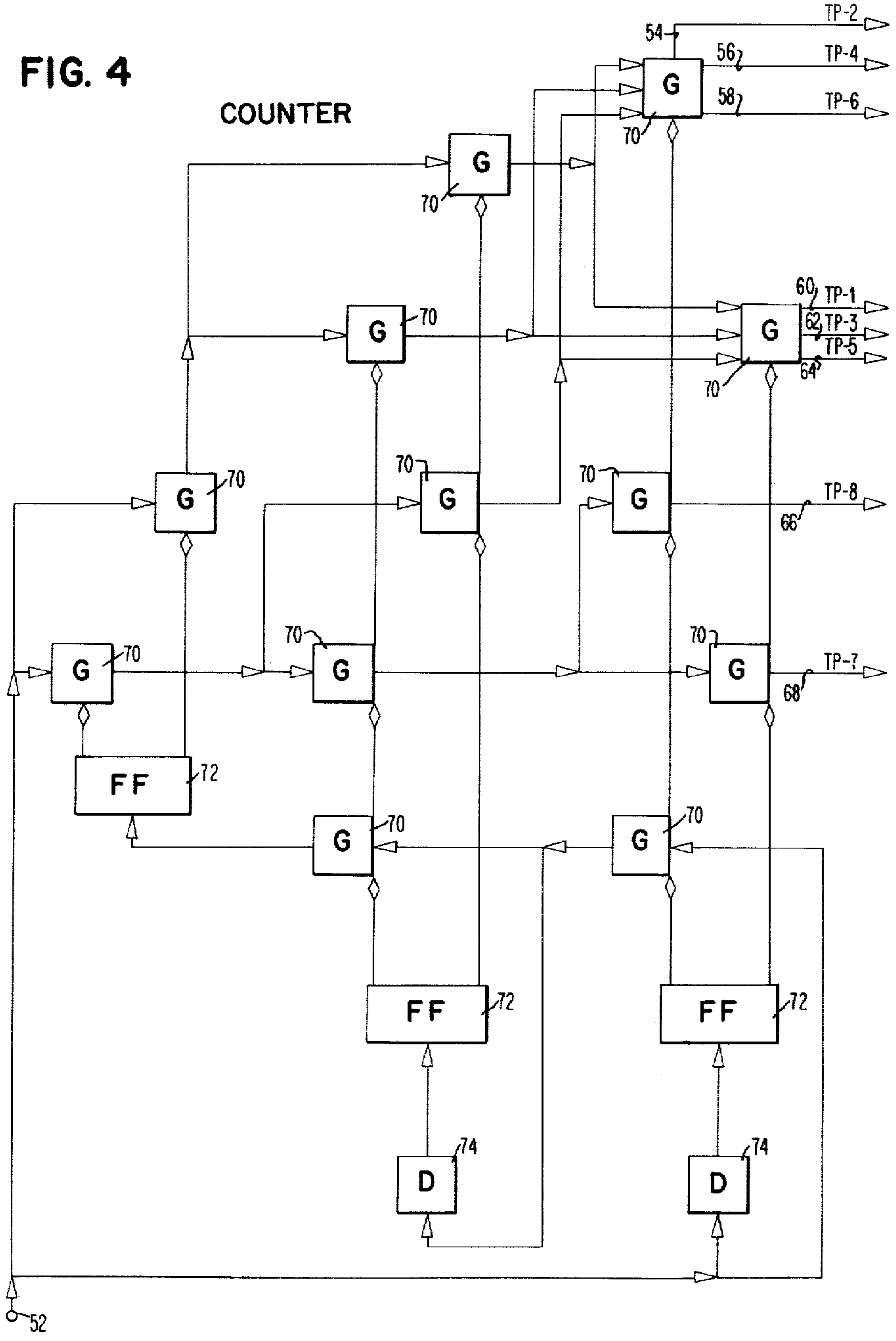
FIG. 4 is a circuit diagram of a suitable counter for use in the embodiment illustrated in FIG. 1.

Referring to FIG. 4 a Counter is described which may be used as Counter 26 in FIG. 1. A series of negative pulses received on Conductor 52 from the pulse generator are divided to produce eight discrete pulses TP–1 through TP–8 on lines 54, 56, 58, 60, 62, 64, 66 and 68. The counter operates in a straight forward manner as a frequency divider and will not be described in more detail.

Figure 5:
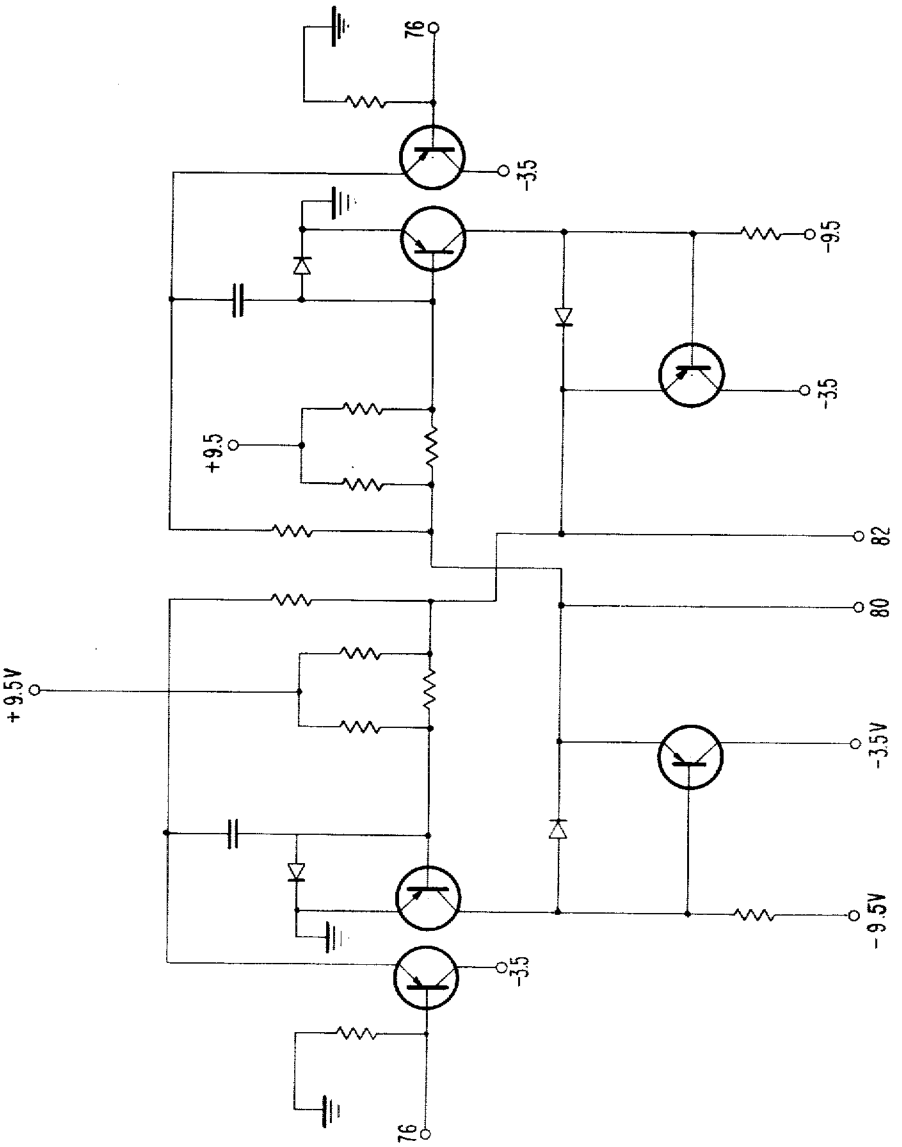
FIG. 5 is a circuit diagram of a suitable flip-flop for use in the embodiment illustrated in FIG. 1.
Figure 6:
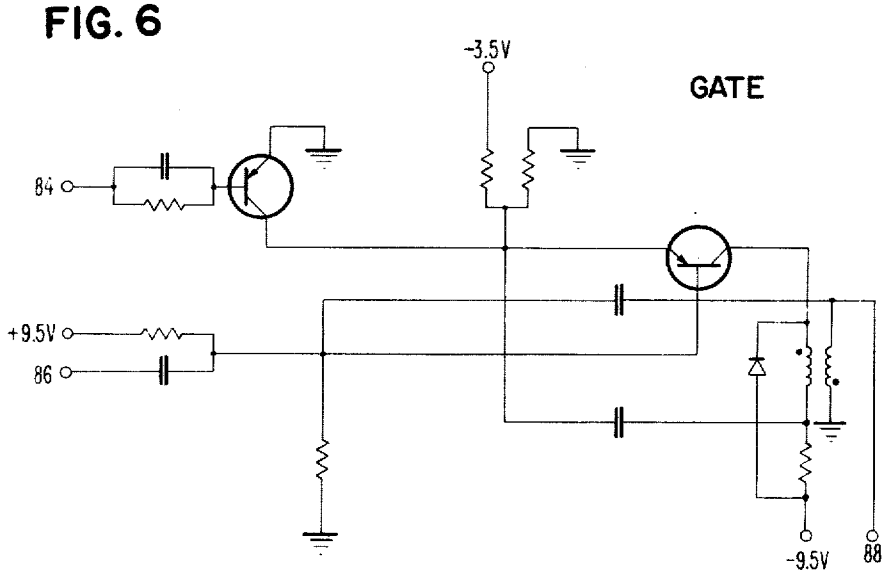
FIG. 6 is a circuit diagram of a suitable gate for use in the embodiment illustrated in FIG. 1.

Gates 70 may be of the type which are shown in FIG. 6. Flip-flops 72 may be of the type shown in FIG. 5. Delays 74 may be any well known delay circuits which are well known and produce approximately a hundred microsecond delay.

*Flip-Flop*

Referring now to FIG. 5 a schematic of a suitable flip-flop is shown which may be used as Flip-flop 28 in FIG. 1 and Flip-flops 72 in FIG. 4. The flip-flop is connected for a complement operation in FIGS. 1 and 4 with points 76 and 78 connected together and the input applied at the point at which they are connected together. Each input pulse thus complements the flip-flop so after each input pulse the output signal is a complement of the previous output signal.

*Gate*

Referring now to FIG. 6 a schematic is shown for a suitable gate which may be used as Gate 32 in FIG. 1 and Gates 70 in FIG. 4. The gate operates in a conventional manner with a D.C. level received on Conductor 84 conditioning the gate to pass a pulse received on Conductor 86 and deliver an output pulse on Conductor 88. A zero D.C. level received on Conductor 84 deconditions the gate while a minus three volt level conditions the gate.

*Discriminator*

Referring to FIGS. 7*a* through 7*c* the function and operation of the Phase Discriminator will be described. The Phase Discriminator compares the phase relationship of the triangular waveforms received from the timing signal amplifier and the square waveforms received from the flip-flop and produces an output that contains a D.C. component with an amplitude proportional to the phase difference between the input triangular waveforms and the square waveforms. The D.C. output current component is zero when the two waveforms are ninety degrees out of phase and any variation from this phase difference will produce either a positive or negative D.C. output current component depending on the polarity of the phase difference.

Reference should first be made to FIG. 7*a* for a description of a simplified block diagram of the Phase Discriminator. The Phase Discriminator is shown in more detail in FIG. 7c and will be described later in relation to that figure.

Referring now to FIG. 7a the Phase Discriminator is comprised of three logical blocks, High Impedance Current Source 92, Switch 94, and Emitter Follower Switch Driver 96. A push-pull 200 kc. triangular waveform is received on Conductors 98 and 100 from the relatively low impedance current source of the Timing Signal Amplifier and delivered to Switch 94 from High Impedance Current Source 92. A 200 kc. square waveform received on Conductors 102 and 104 from Flip-flop 28 in FIG. 1 is delivered to Emitter Follower Switch Driver 96. Emitter Follower Switch Driver 96 causes Switch 94 to change positions each time the output of the Flip-flop 28 in FIG. 1 changes states.

For the purpose of the immediate description assume that Flip-flop 28 in FIG. 1 is complementing at a 400 kc. rate and delivering a 200 kc. square wave output that is ninety degrees out of phase with the triangular waveform input. The triangular waveform is shown as waveform A in FIG. 7b and the square waveform is shown as the solid line waveform B. The output waveform from the Phase Discriminator is shown as the solid waveform C in FIG. 7b. As the square waveform and triangular waveform are both 200 kc. and ninety degrees out of phase the value of the D.C. current component is zero and does not affect the generation of pulses by the pulse generator. Thus the drum is rotating in synchronism with generation of pulses by pulse Generator 24 in FIG. 1.

For the purposes of further description assume for the moment that the oscillator frequency increases for some unknown reason. The increase in frequency of the oscillator causes the Flip-flop 28 in FIG. 1 to change states sooner producing a square wave shown by the dotted square waveform B in FIG. 7b, the change causing a change in the output waveform as shown by dotted waveform C in FIG. 7b. A D.C. current component is produced as shown with relation to waveform C in FIG. 7b and applied to Pulse Generator 24 in FIG. 1 to lower the frequency of oscillation of Pulse Generator 24 in FIG. 1. After the frequency is lowered the flip-flop changes states slower and the square waveform and triangular wave form again come into synchronism.

As the pulse generator tried to increase its frequency in order for the pulse generator to operate at the original frequency a small D.C. current in the proper direction must be supplied to the pulse generator. The Phase Discriminator supplies this current by allowing the phase relationship between the triangular and square waveforms to shift slightly as shown in FIG. 7b, waveform C.

The operation of the Phase Discriminator is similar when the speed of rotation of the drum changes. A simplified block diagram of the Phase Discriminator has been described and a schematic of circuitry capable of performing the operation described will next be described.

Reference should now be made to FIG. 7c for a description of the circuitry which may be used as the Phase Discriminator. High Impedance Current Source 108 in FIG. 7b corresponds to High Impedance Current Source 92 in FIG. 7a. The triangular waveform is received on Conductors 110 and 112 and applied to the emitters of Transistors 114 and 116. Transistors 114 and 116 provide a current gain of about unity and a high output impedance. Inductors 118 and 120 provide a high impedance path to the signal and Capacitors 122 and 124 are coupling capacitors.

Switch 126 is equivalent to Switch 94 in FIG. 7a and is a diode switch consisting of diodes and resistors. The switch is operated by the zero to minus 3.5 volt square wave inputs received on Conductors 128 and 130. The two square wave inputs are identical, except that one is inverted from the other. Emitter Follower Switch Driver 132 "powers up" the square wave inputs. The operation of the Emitter Follower Switch Driver is straight forward and will not be further described.

Assume for the immediate description that initially the square waveform received on Conductor 128 is positive and that received on Conductor 130 is negative. Diodes 134 and 136 thereupon become forward biased and Diodes 138 and 140 back biased. Current flowing through Capacitor 122 flows through Diodes 134 and 136 and through the emitter followers to ground. As Diodes 142 and 144 are also back biased no potential from Conductors 128 and 130 is applied to Diodes 146 and 148. Current flow through Capacitor 124 flows through Diodes 146 and 148 and is delivered to Conductor 150 to Pulse Generator 24 in FIG. 1.

A reversal of the voltage inputs at Terminals 128 and 130 causes the operation of the Phase Discriminator to be reversed also.

*Start Over*

Although the Phase Discriminator is capable of starting by itself with nominal and near nominal conditions, extreme conditions can cause a failure to "lock-in" properly. The start circuit is added to cause the triangular waveform and square waveform to initially "lock-in" properly. Once the signals are locked in, they will stay locked in over a very wide range of conditions; therefore, the start circuit is effectively disconnected during operation and its operation need only be considered during starting.

Still referring to FIG. 7c with the Transfer Contacts 152 normally closed in the position shown. Diode 154 is back biased and Capacitor 156 and Resistor 158 are disconnected; therefore, the entire start circuit is effectively disconnected.

To begin the start action, the transfer contact is moved from the normally closed side to the normally open side to cause Capacitor 160 (in FIG. 3 in the pulse generator) to suddenly charge in the negative direction causing the oscillator frequency to change quickly to about five to six mc. Because the charge is placed quickly on Capacitor 160 (in FIG. 3), the inrush current is very high. This insures that any false or even true synchronism is broken. Capacitor 160 (in FIG. 3) now begins to discharge causing the oscillator frequency to slowly decrease. About one ma. of current flows through Diode 154 (now conductors), and through Resistor 162 to the 9.5 v. source to cause the oscillator frequency to slowly decrease to a low value to insure a crossing of the proper lock-in oscillator frequency (about 3.2 mc.).

In a few milli-seconds, the oscillator frequency lowers to the proper value for lock-in (near 3.2 mc.) and causes the triangular waveform and the square waveform to approach the same frequency, insuring lock-in. Note that oscillator frequency approached the proper lock-in frequency from the high side. This is done to prevent a false synchronism which could occur due to the square wave harmonics if the proper lock-in frequency had been approached from the low side.

Because the triangular wave contains some harmonics (lesser in amplitude than with the square wave) a less likely possibility is a false lock-in approaching from the high side. This is prevented by not allowing the oscillator frequency to go higher than about 5 mc. (built into oscillator circuit).

After sufficient time has been allowed for the above to occur (about 25 milli-seconds) the transfer contact returns to its original position. Doing this disconnects Capacitor 156, which will then discharge through Resistor 158, and stops the one ma. of D.C. current flow being supplied by the Phase Discriminator. Since this current can be no longer supplied, the phase between the triangle wave and the square wave will shift slightly to allow for the change. Synchronism is not broken and the oscillator is now normally operating.

*Timing Head Assembly*

FIG. 8 shows a schematic of a suitable amplifier and timing head assembly which may be used for the Timing Head Assembly 18 and Timing Signal Amplifier 20 in FIG. 1. The timing head assembly and amplifier are conventional in nature and serve to amplify the signals read from the timing track. The output on Conductors 164 and 166 are delivered to the Phase Discriminator. The output on Conductors 168 and 170 are delivered to the AND-NOT circuit 30 (in FIG. 1). The Timing Head 172 reads the signals from the timing track.

FIG. 9 should now be referred to for a description of the schematic of the AND-NOT circuit which may be used for the AND-NOT circuit in FIG. 1. The AND-NOT circuit has 2 inputs, a D.C. level input on Conductor 174 from Flip-flop 28 (in FIG. 1) and input on Conductors 176 and 178 from the timing signal amplifier. The D.C. input on Conductor 174 is at −3 volts during the On state and at "0" volts during the Off state. The inputs from the amplifier on Conductors 176 and 178 are a 3 volt peak to peak timing signal that is balanced to ground. The output on Conductor 180 is a D.C. level which is a −3 volts in the On state and ground in the Off state. An output D.C. level will be delivered to Conductor 180 when the input on Conductor 174 is at "0" volts and when the voltage on Conductor 176 is more negative than the voltage on Conductor 178. During any other combination of input signals the output on Conductor 180 will be Off.

While the invention has been particularly shown and described with reference to preferred embodiment thereof, it will be understood by those skilled in the art that various changes in form and details may be made therein without departing from the spirit and scope of the invention.

What is claimed is:

1. In combination with a moving storage surface having a plurality of successive regularly spaced storage registers, means associated with said storage registers for generating timing signals having a definite time relation to respective ones of said storage registers, means for deriving a signal of periodic waveform from each of said signals generating means pulse generating means for generating timing pulses whose frequency is an integral multiple of the frequency of said signals, distribution, means responsive to said pulse generating means for dividing said timing pulses into groups of timing pulses each group corresponding to at least one of said storage registers, and means connected between said distribution means and said pulse generating means for continuously synchronizing the generation of said timing pulses with said signal of periodic waveform.

2. In combination with a moving magnetic drum having a plurality of successive regularly spaced storage registers, means associated with said storage registers for generating timing signals having a definite time relation to respective ones of said storage registers, means for deriving a signal of periodic waveform from each of said signal, generating means, pulse generating means for generating timing pulses whose frequency of repetition is an integral multiple of the repetition rate of said timing signals, distribution, means connected to said pulse generating means for dividing said timing pulses into groups of serially related timing pulses, each group corresponding to at least one storage register, and means responsive to said signal of periodic waveform and to one pulse of each said group for continuously synchronizing the generation of said timing pulses with said signal of periodic waveform.

3. In combination with a moving magnetic drum having a plurality of successive regularly spaced storage registers, means associated with said storage registers for generating timing signals having a definite time relation to respective ones of said storage registers, means for deriving a signal of periodic waveform from each of said signal generating means, pulse generator means for generating timing pulses whose frequency is an integral multiple of the frequency of said timing signals, a counter responsive to said pulse generator for dividing said timing pulses into series of timing pulses, each series corresponding to at least one storage register, a flip-flop, connected to said counter for receiving last one of the pulses from each series of timing pulses, a phase discriminator, connected to said flip-flop and said reading means for comparing the output of said flip-flop and said periodic waveform and synchronizing the generation of pulses by said pulse generator with said signal of periodic waveform.

4. An indexing circuit for generating indexing signals from a timing track on a moving surface comprising a timing track on a moving surface having a series of equidistant timing marks thereon, at least one of said timing marks being different from the rest of said series of marks, means for deriving a periodic waveform from said timing track, pulse generating means for generating a plurality of timing pulses in synchronization with said periodic waveform, an AND circuit supplied with said periodic waveform and said timing pulses, said AND circuit producing an output when the portion of said waveform derived from said different mark and one of said timing pulses are simultaneously supplied, means responsive to the output of said AND circuit for gating at least one of said timing pulses.

5. A drum indexing circuit for generating index signals comprising a rotating drum having a timing track, said timing track having a plurality of equidistant timing signal generating means thereon, at least one of said signal generating means being different from the rest of the timing signals, pulse generating means associated with said rotating drum for generating a plurality of pulses in synchronism with said timing signals, an AND NOT circuit associated with said rotating drum and said pulse generating means and responsive to the coincidence of said different timing signal and a synchronized pulse for generating an output, gating means connected to said AND NOT circuit and said pulse generating means for gating at least one synchronized pulse in response to the output of said AND NOT circuit.

References Cited in the file of this patent

UNITED STATES PATENTS

| | | |
|---|---|---|
| 2,813,927 | Johnson | Nov. 19, 1957 |
| 2,817,701 | Johnson | Dec. 24, 1957 |
| 2,926,341 | Scarbrough | Feb. 23, 1960 |

UNITED STATES PATENT OFFICE

CERTIFICATE OF CORRECTION

Patent No. 3,105,228

September 24, 1963

William Y. Elliott, Jr.

It is hereby certified that error appears in the above numbered patent requiring correction and that the said Letters Patent should read as corrected below.

Column 7, lines 38 and 39, for "signals" read -- signal --; same line 39, for "means", first occurrence, read -- means, --; column 8, line 18, after "receiving" insert -- the --.

Signed and sealed this 14th day of April 1964.

EAL)
test:

IEST W. SWIDER esting Officer

EDWARD J. BRENNER

Commissioner of Patents